United States Patent
Rudberg et al.

(10) Patent No.: US 10,981,342 B2
(45) Date of Patent: Apr. 20, 2021

(54) SERVO MOTOR TENSION CONTROL FOR MODULAR AFP HEAD ASSEMBLY

(71) Applicant: ELECTROIMPACT, INC., Mukilteo, WA (US)

(72) Inventors: Todd M. Rudberg, Shoreline, WA (US); Owen Lu, Lynnwood, WA (US)

(73) Assignee: Electroimpact, Inc., Mukilteo, WA (US)

( * ) Notice: Subject to any disclaimer, the term of this patent is extended or adjusted under 35 U.S.C. 154(b) by 66 days.

(21) Appl. No.: 16/188,990

(22) Filed: Nov. 13, 2018

(65) Prior Publication Data

US 2020/0147906 A1    May 14, 2020

(51) Int. Cl.
*B29C 70/56* (2006.01)
*B29C 70/38* (2006.01)

(52) U.S. Cl.
CPC ............ *B29C 70/56* (2013.01); *B29C 70/384* (2013.01)

(58) Field of Classification Search
CPC ....... B29C 70/56; B29C 70/38; B29C 70/382; B29C 70/384; B29C 70/386; B29C 70/388
See application file for complete search history.

(56) References Cited

U.S. PATENT DOCUMENTS

| | | | | |
|---|---|---|---|---|
| 5,431,749 A | * | 7/1995 | Messner | B29C 70/545 156/358 |
| 6,491,773 B1 | * | 12/2002 | Miller | B29C 53/8016 156/229 |
| 2006/0180264 A1 | * | 8/2006 | Kisch | B29C 70/32 156/173 |
| 2008/0295954 A1 | * | 12/2008 | Kisch | B29C 70/384 156/249 |
| 2012/0241093 A1 | * | 9/2012 | Borgmann | B29C 70/384 156/350 |
| 2014/0238612 A1 | * | 8/2014 | Vaniglia | B65H 59/04 156/510 |
| 2017/0101286 A1 | * | 4/2017 | Brockman | B65H 59/04 |

* cited by examiner

*Primary Examiner* — George R Koch
(74) *Attorney, Agent, or Firm* — Clark A. Puntigam; Jensen & Puntigam P.S.

(57) ABSTRACT

A modular head assembly or end effector for a fiber placement machine having a machine controller includes a back plate and a plurality of carbon fabric spool assemblies, each assembly including a servo motor combination and a dancer assembly for maintaining tension of the fabric as it is payed out. The spool assemblies include a linear displacement sensor for the dancer assembly and a sensor for determining the diameter of the carbon spool, the outputs of which are used to control the action of the servo motors. A programmable disconnecting assembly mates the modular head assembly with the fiber placement machine.

8 Claims, 12 Drawing Sheets

SERVO MOTOR TENSION CONTROL FOR MODULAR AFP HEAD ASSEMBLY

TECHNICAL FIELD

This invention relates generally to automatic fiber replacement (AFP) machines and more specifically concerns a modular head assembly for AFP machines.

BACKGROUND OF THE INVENTION

Automatic fiber replacement (AFP) machines currently have two primary mechanical configurations. One is the integral head or end effector design (IEE) and the other is the modular head or end effector design (MEE). Both designs use carbon fiber tow wound onto a bobbin or spool. In general operation, the fiber on the spools is unwound by a motor with a tensioning assembly and is directed to a placement tool which lays or places the fiber on a part, such as an aircraft part. Consistent tension on the fiber must be present during operation; otherwise tangling or breaking can occur, resulting in failure of the tape laying process.

Traditional IEE design requires electrical connections from the IEE to the main CNC processor which controls the overall fiber replacement machine. The carbon fiber in the form of tow spools is threaded through a series of redirects to the tow deposit system, which includes an add-cut-clamp module. The long path of the carbon fiber to the tow deposit, which is referred to as the tow path, requires conventional servo motors to control tension in the system.

On the other hand, the MEE design has advantages of serviceability. In the MEE approach, the material spools are loaded on the head itself. Due to the relatively short tow path, tension is a less severe issue and pneumatic braking systems have been used in place of a servo motor system for tension control. The pneumatic braking system has the advantage of being lightweight and does not require the numerous electrical power supplies, drives and wire connections that servo motor systems normally require. However, the tension, repeatability and reliability of present MEE systems with pneumatic braking to maintain tension on the tow is insufficient during high acceleration and high speed payouts. Although servo control has in the past been an effective solution to maintain tension in IEE systems, implementation has heretofore not been accomplished in MEE systems, due to size, power and inertia constraints on the tensioning system. Further, communication with the remote machine CNC would require communication with each servo motor individually, creating many more connections between the modular head and the remote CNC than in current MEE systems. The sheer number of connections which would have to be made quickly and reliably such as when spools are damaged or replaced, has prevented use of modular head based servo controlled spool motors in the past.

SUMMARY OF THE INVENTION

Accordingly, the present invention is a modular end effector for a fiber placement machine; comprising: a plurality of individual carbon fiber spool assemblies, each spool assembly including a spindle with a spool containing carbon fiber tow, a servo motor with electrical drive, and a dancer assembly for tensioning the carbon fiber tow as it moves from the carbon fiber tow containing spool to a tool assembly which applies the carbon fiber tow to a part; a sensor assembly for each carbon fiber spool assembly for measuring the dancer assembly position; wherein the servo motor controls the rotation of the carbon fiber tow containing spool to maintain the dancer assembly position and thereby control tension on the carbon fiber tow; a disconnecting device for the modular end effector relative to the fiber placement machine, the modular end effector being attached mechanically, with electrical and fluid connections to the fiber placement machine; and wherein electrical drives for the servo motors which drive the fiber spool assemblies are located in the modular end effector, reducing the number of electrical connections which extend through the disconnecting device to the fiber placement machine.

BEST MODE FOR CARRYING OUT THE INVENTION

Figure 1:
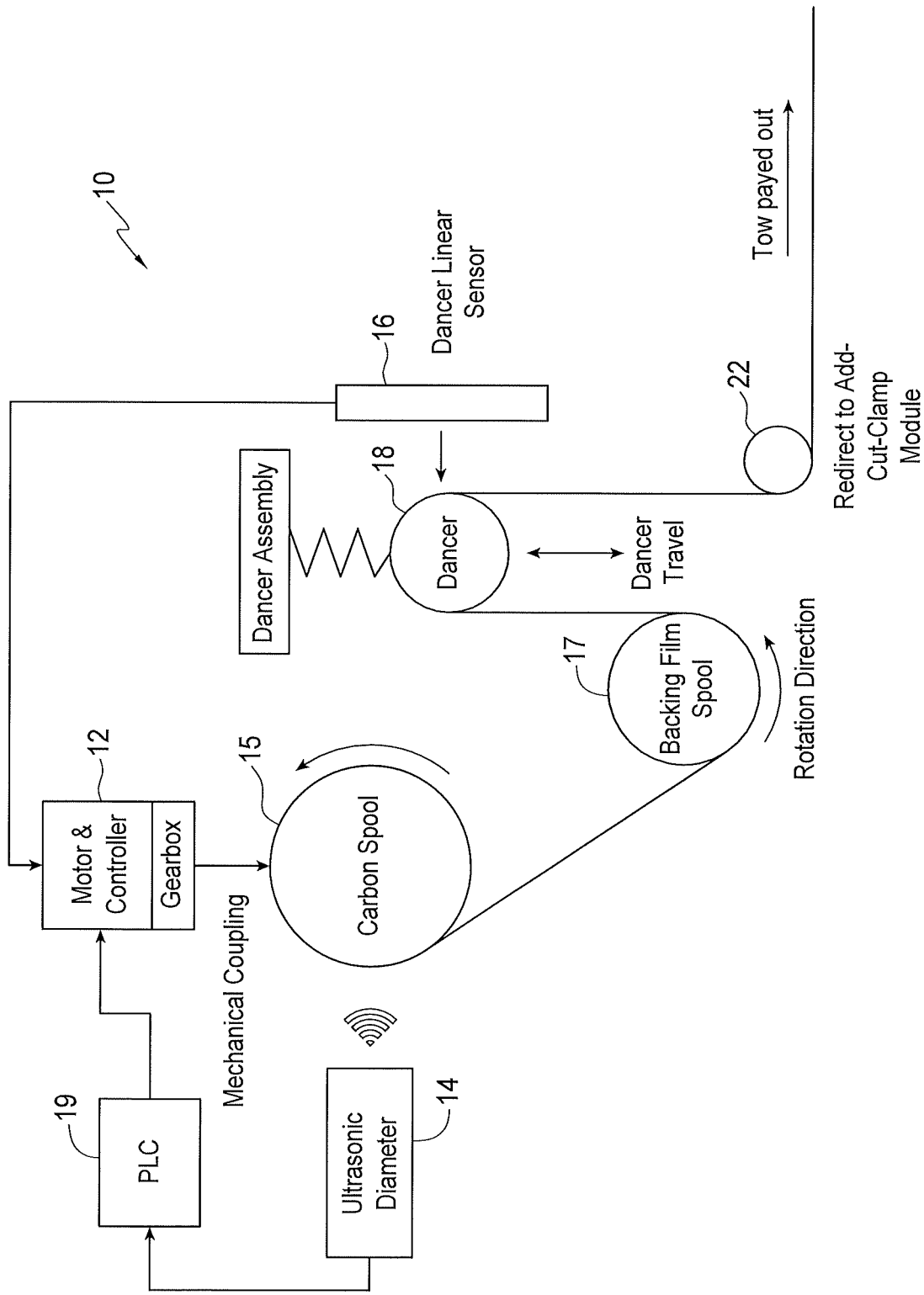
FIG. 1 is a functional diagram of the system of the present invention.

FIG. 1 is a simplified functional diagram of the tensioning system portion of the modular head/end effector assembly or unit of the present invention, showing the progress of the tow from the spool to the tool which lays the fabric on a part, such as an aircraft wing. The system, as shown generally at 10 includes a servo motor and controller, referred to as servo motor/controller hereafter, and gear box assembly 12 which is controlled via inputs from a diameter sensor 14 which senses the diameter of a carbon fabric spool 15 and an input from a linear sensor 16 which senses the position of a dancer element 18 which controls the tension on the fabric tow. A PLC computer 19, in one embodiment is located on the modular head assembly for control of the individual servo motor/controllers.

In operation, the fabric backing is unwound from the carbon spool 16 under the control of the servo motor assembly 12. The fabric proceeds to a backing spool 17, which removes a backing film from the fabric which then proceeds to the dancer tensioning assembly 18 and from there to one or more redirects 22 and the clamp/add/cut portions of the system. While the backing spool 17 will typically be present in the system, it is not necessary, as the backing film may be removed by other elements or not present for some material types.

Figure 2:
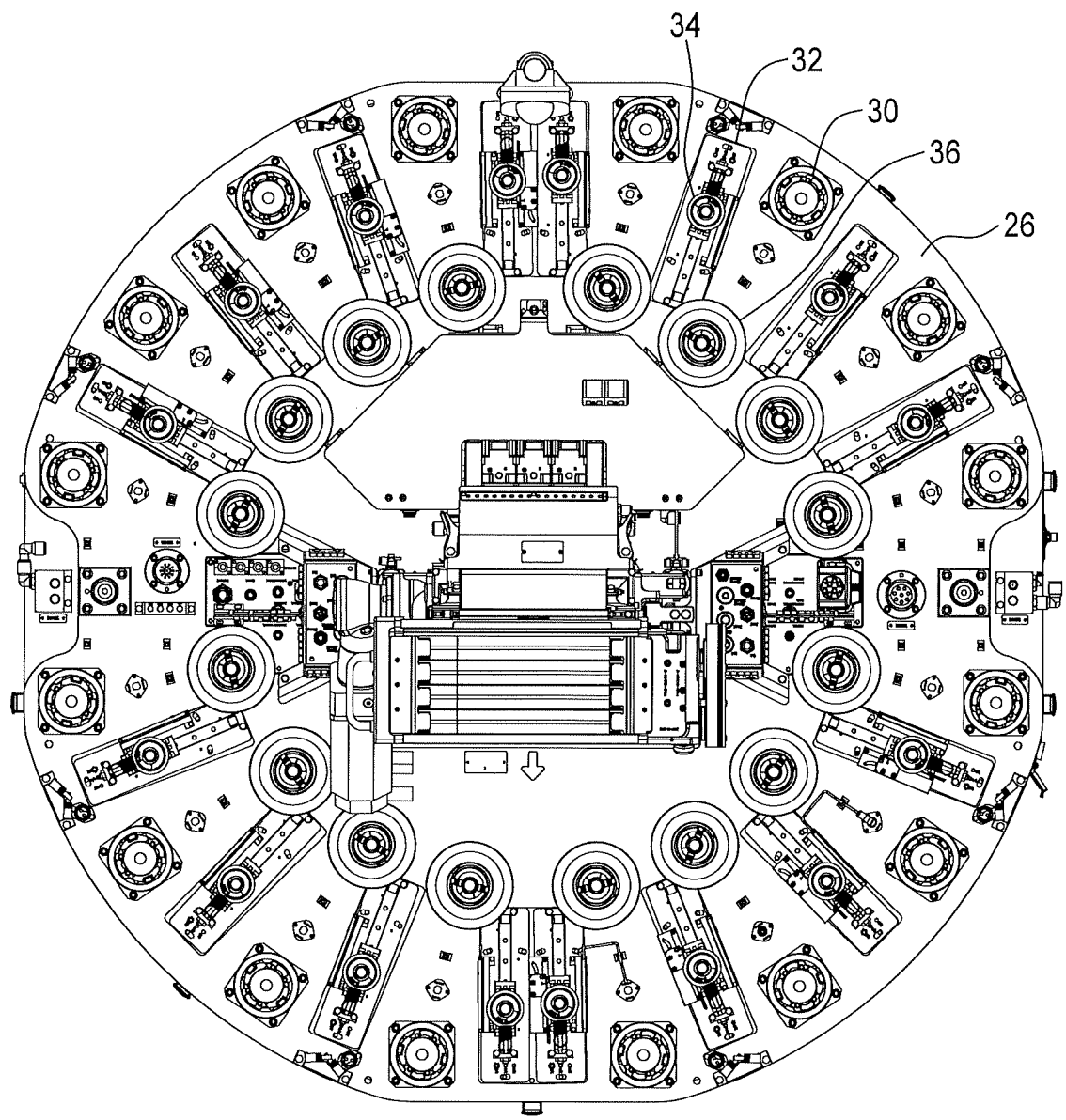
FIG. 2 is a front elevational view of the modular head assembly of the present invention.
Figure 3:
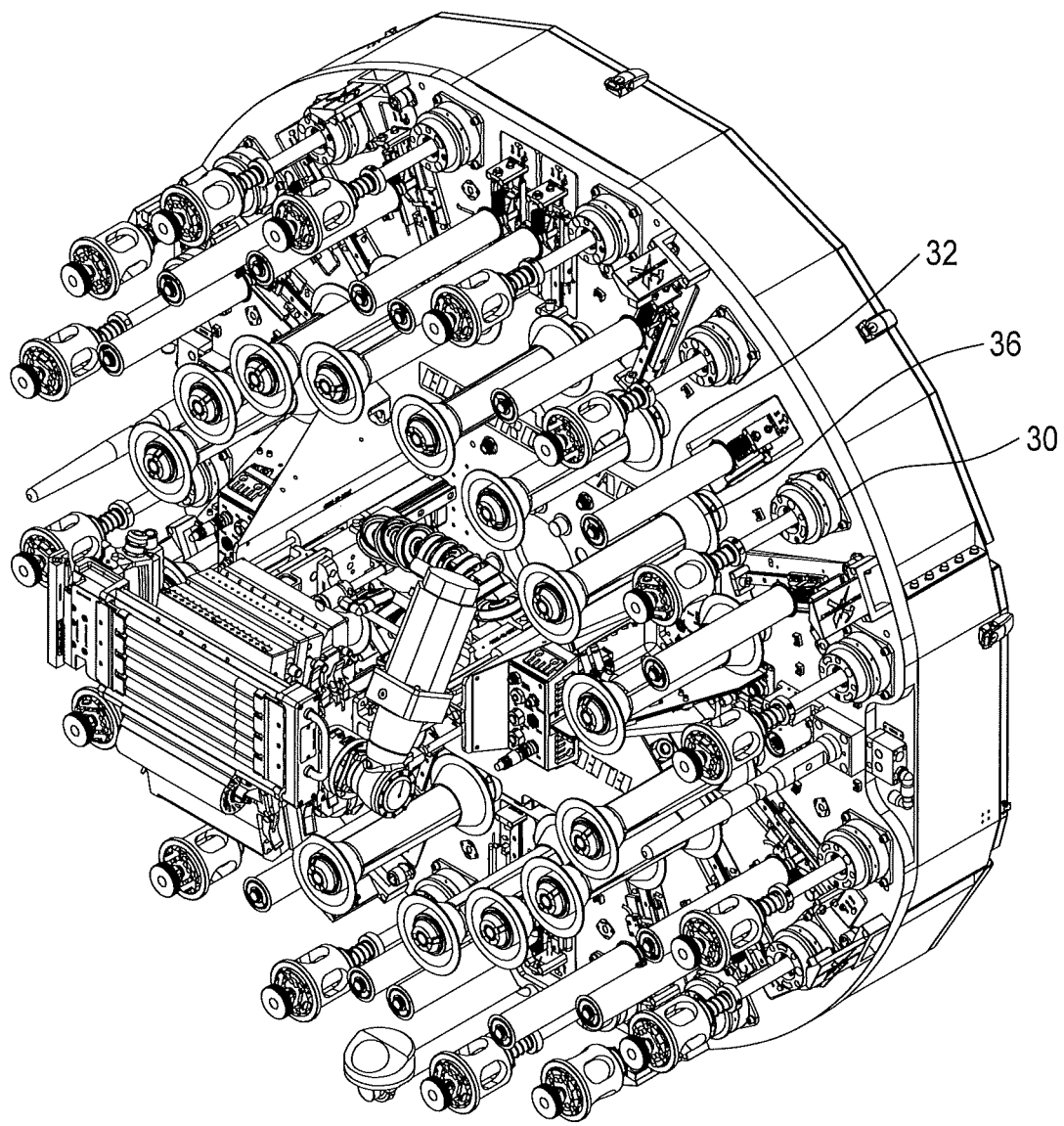
FIG. 3 is a perspective view of the modular head assembly.

FIGS. 2 and 3 illustrate a carbon fiber modular head assembly. A typical modular head assembly will include a plurality of identical carbon fiber placement assemblies arranged in a circular fashion. The modular head assembly is attached to a fiber placement machine which is controlled by a CNC processor, typically located remotely from the modular head itself.

FIGS. 2-5 show various views of a modular head assembly, including a plurality of individual servo motor controlled carbon spool assemblies. FIG. 2 shows a back plate or frame 26 on which are mounted a plurality of spool assemblies including a spool containing the carbon fiber material. Each spool assembly, for example 30, comprises a servo motor/controller which rotates a spindle to let the carbon fiber plus backing film off the spool portion of the spool assembly. The diameter of the spool as it is rotated is sensed by an ultrasonic sensor 32 which continuously measures the diameter of the spool for a proper speed command for the servo motor. Each spool assembly also includes a dancer assembly 34 which is used to control the tension of the carbon during the payout thereof. The dancer assembly includes a sliding assembly on which the dancer linearly moves. A linear displacement sensor, such as a linear encoder 35 provides dancer position information back to the servo motor/controller.

Figure 4:
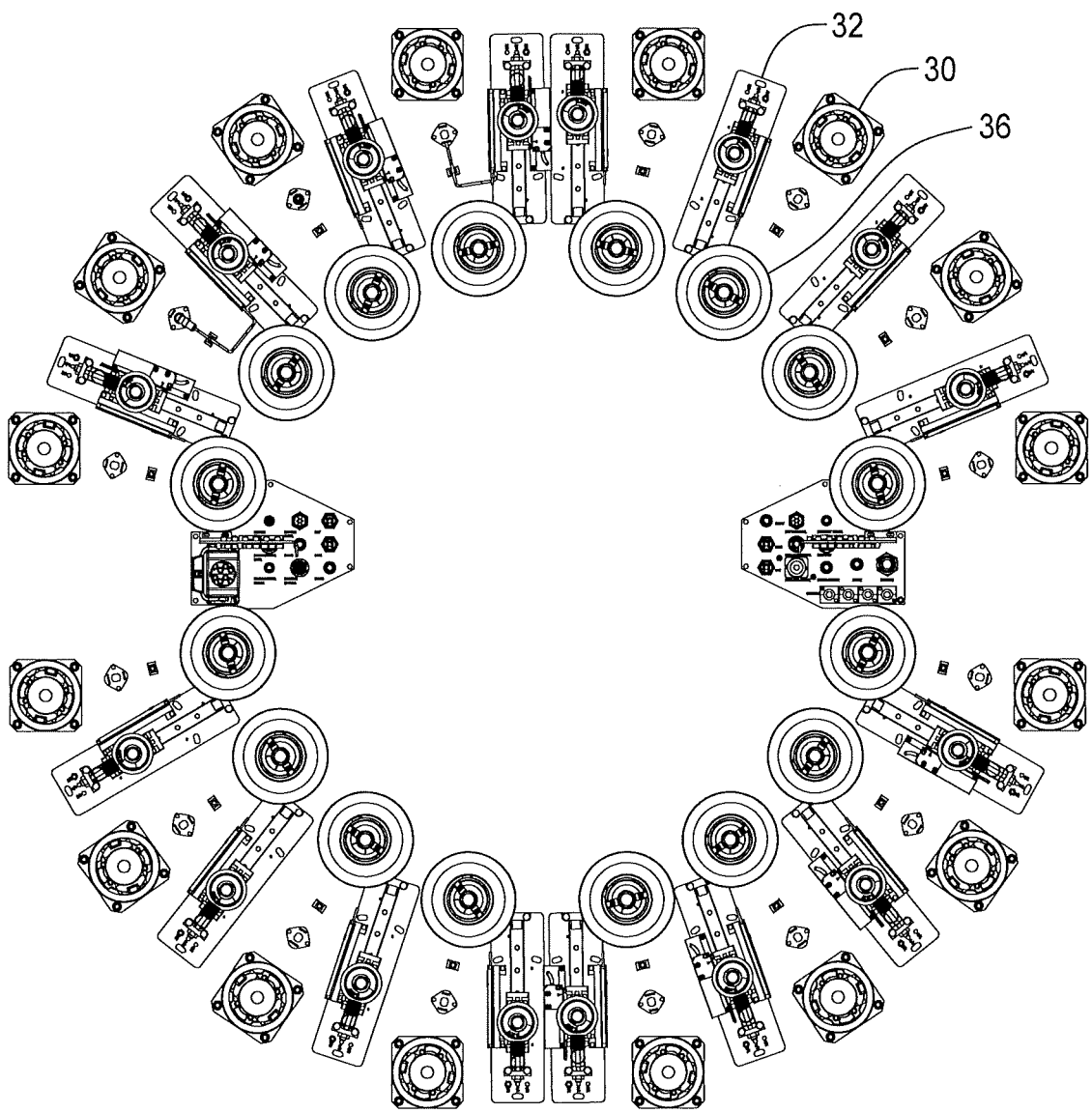
FIG. 4 is a front view of the creel assembly portion of the modular head assembly.
Figure 5:
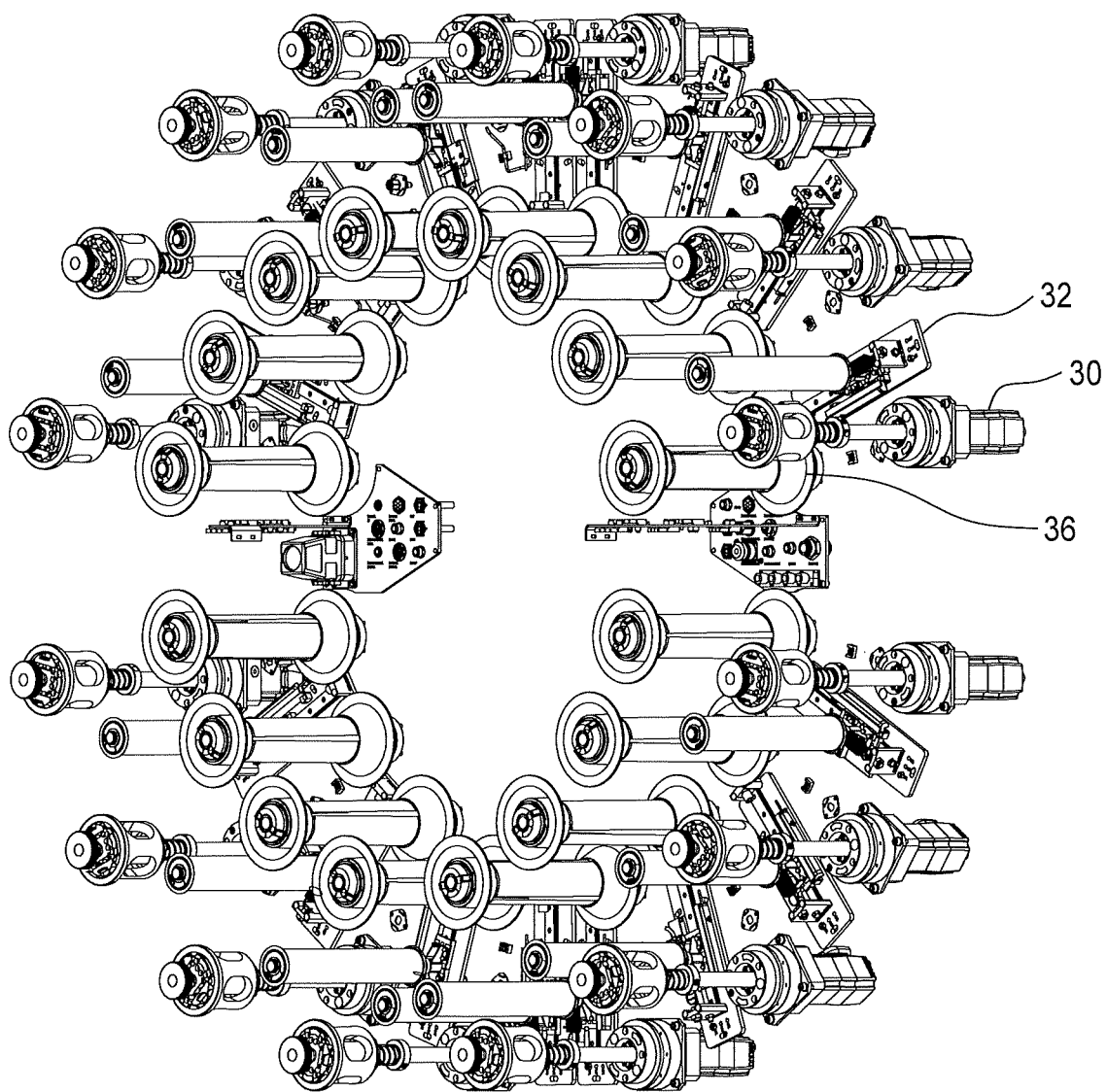
FIG. 5 is a perspective view of the creel assembly portion of FIG. 4.

Each spool assembly also typically includes a backing film removal assembly 36 which removes the plastic backing film, if present, from the carbon fiber before the fiber is laid down on the part by a fiber placement tool. FIGS. 4 and 5 with more clarity show the arrangement of elements 30, 34 and 36 of one spool assembly. The plurality of spool assemblies combined with the dancer 34 and backer 36 for the modular head is referred to as the creel.

Figure 7:
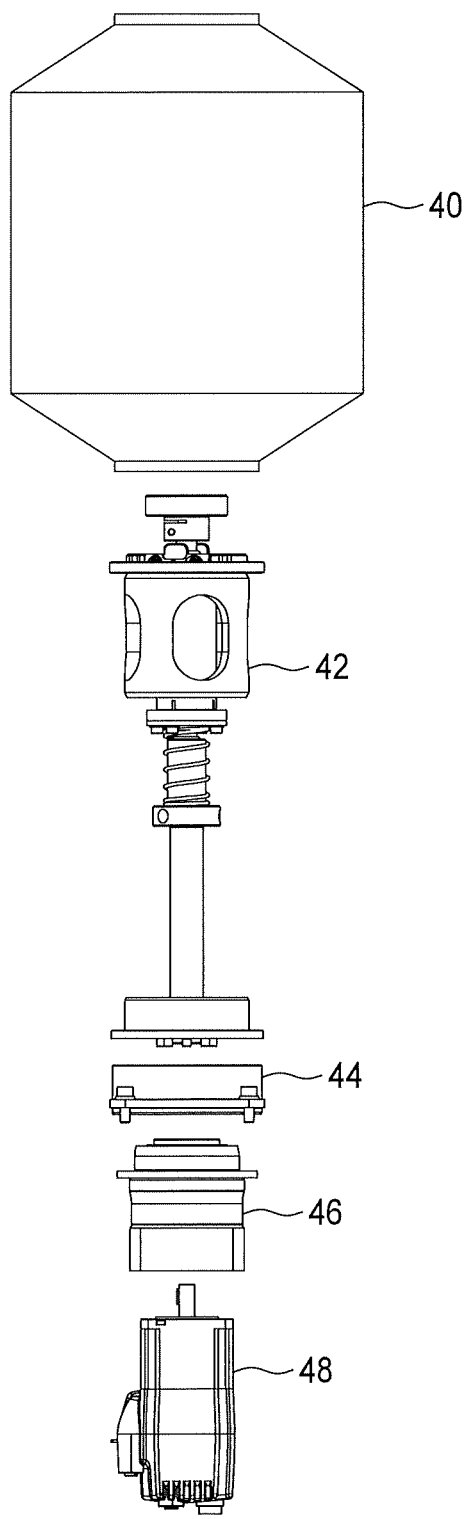
FIG. 7 is a schematic view of the servo motor/gearbox portion of the modular head assembly.

FIG. 7 is an exploded view of the material spindle assembly of the spool assembly. It includes a material spool 40 which contains the combination of carbon fiber material and polymer backing film. The polymer backing film is removed in the process of unwinding the material from the material spindle assembly 42 on which spool 40 is mounted and which in turn is mounted directly on the gear drive locking the carbon fiber spool 40 so that there is no relative motion. This ensures that the gearbox output flange on 46 rotates at the same speed as the carbon fiber spool 40. The spindle 42 must be able to support the load of the spool 40 during acceleration and loads due to gravity. Mounting flange 44 connects to gearbox 46 and mounts the complete assembly to the back plate of the modular head assembly.

Gearbox 46 reduces the rotational speed of the spindle and hence the spool 40 and increases the torque of the motor which allows the motor to move the high inertia spool 40. It also is strong enough to handle the spool/fabric load due to the inertial forces from head rotation and translation, of the spool as well as gravity. The servo motor/controller/amplifier shown at 48 in FIG. 7 is an integrated unit with servo motor and amplifier into one package. The servo motor/controller 48, in one embodiment, has a analog and digital I/O capabilities and receives spool diameter information and linear position of the dancer information to maintain tension in the tape/tow from the spool. The servo motor/controller 48 is capable of forward and backward movement, again to maintain proper tension on the tape/tow. One example of a commercially available servo motor/controller having such a capability is model SM23166MT by Moog, Inc. In another embodiment, the servo motor/controller receives drive and control information from a local PLC computer mounted on the modular head assembly. In the present embodiment, discussed above, the servo motor/controller is completely self contained, capable itself of controlling the spindle with input from the diameter sensor and the linear displacement sensor. In both of these embodiments, the control of the servo motors is localized on the modular head. There are no wires or other connections for drive and control of the servo motors with the remote CNC. Both of these embodiments include a servo motor controller, which, as indicated above, has significant advantages over existing modular head/end effector arrangements with pneumatic braking, and eliminates the long wire connections necessary for control of the individual servo motors to the CNC computer.

Figure 8:
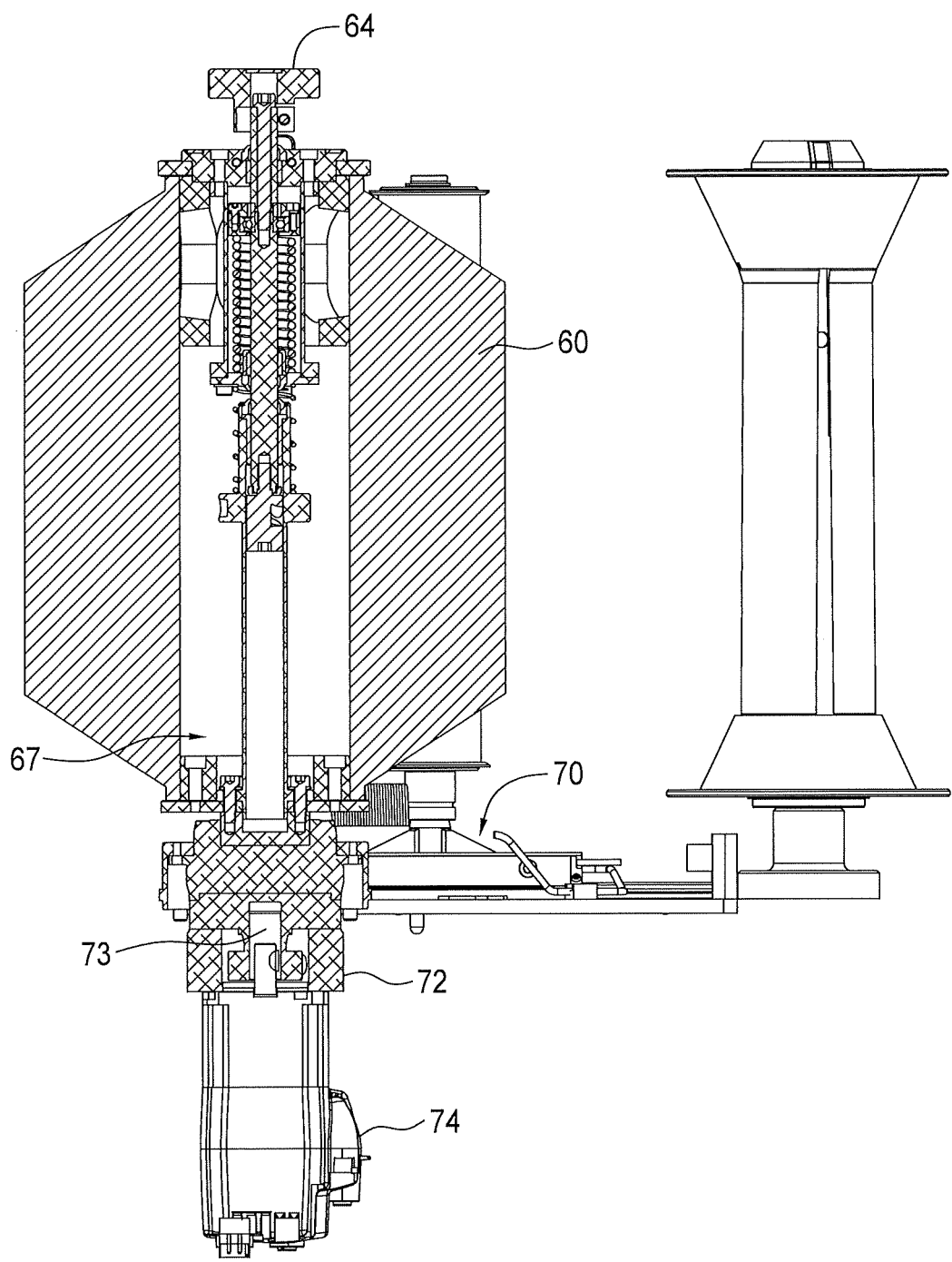
FIG. 8 is a cross-section of the servo-tension assembly portion of the modular head assembly.

FIG. 8 shows one spool assembly in cross section. It includes a spool of fiber 60, with a spring loaded support rod 64. In the nominal position, rod 64 is pulled downwardly toward the gearbox assembly, which locks the spool, which is typically cardboard, to the output flange. When the spool is to be unlocked, the rod 64 is pulled upwardly and rotated to bring it into a higher locked position. The spool 60 may then be changed if desired. After loading a new spool, a switching motion of the rod relocks it in place.

Also when the locking rod is in its nominal position, pulled downwardly, support pads 67 are expanded due to a wedge action. The expansion of the pads 67 applies a normal force to the spool which results in a friction hold on the spool. This ensures that the carbon spool rotates at the same rate as the gear box output flange.

A linear displacement sensor 70 or linear encoder, such as a magnetic encoder, on the dancer assembly, discussed in more detail below, indicates the linear displacement of the dancer element. This information is fed to the servo motor directly and also to the PLC, depending on the embodiment, for error detection.

Gearbox 72 in the embodiment shown includes a 10-1 reducer element responsive to the shaft 73 input, to produce a reduced output speed. This allows support of the bearing load in different orientations and during acceleration induced by machine motion because of the cantilevered position of the spool.

The servo motor/controller is shown at 74 in FIG. 8. The motor has the ability to receive operational commands from the PLC computer on the head in one embodiment as well as inputs from encoders and analog sensors, such as the encoder on the dancer assembly.

Figure 9:
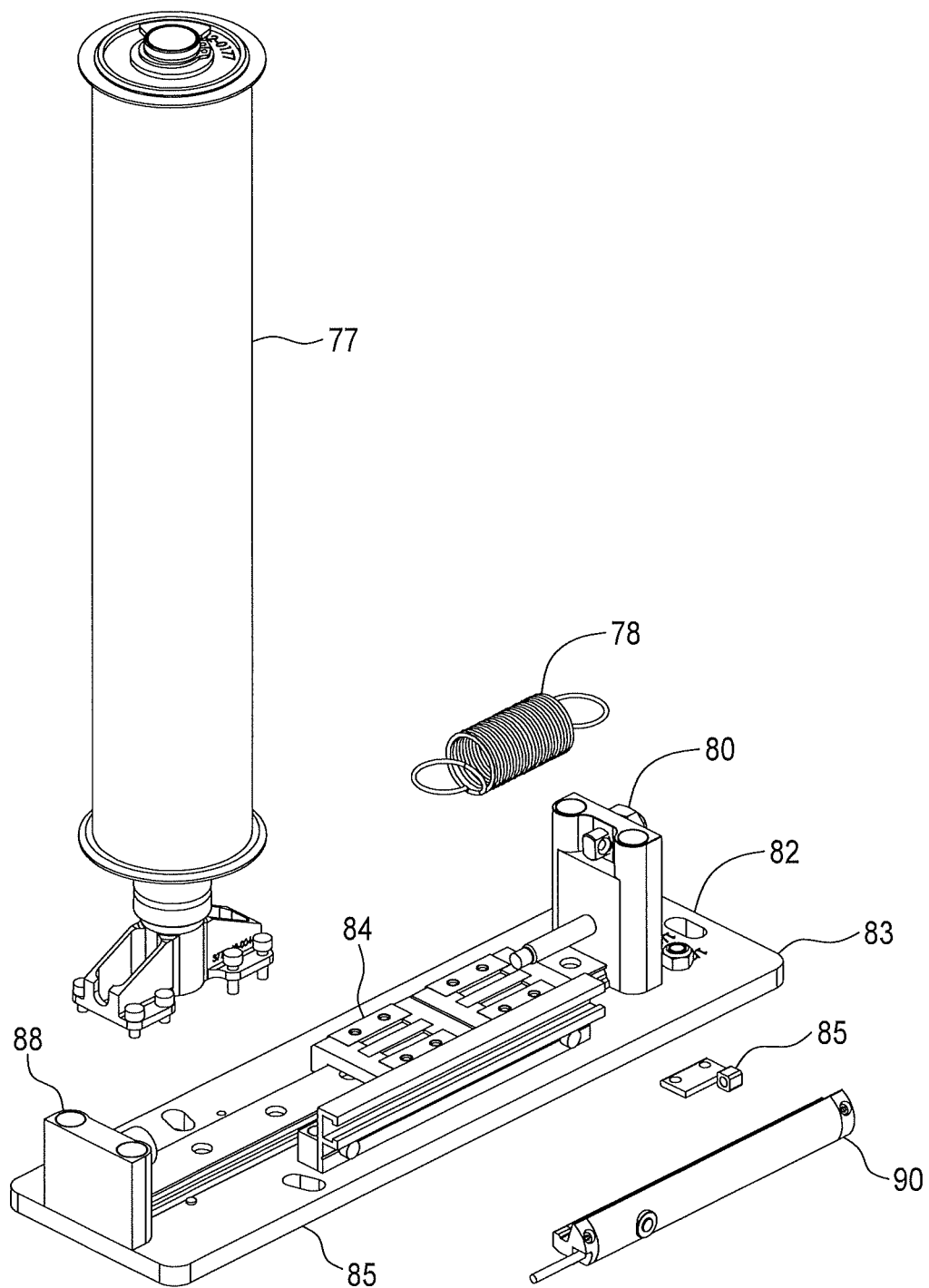
FIG. 9 is a schematic view of the dancer tensioning assembly portion of the modular head assembly.

FIG. 9 shows the dancer assembly which measures tow tension. Tow tension could also be measured by a torque meter at the base of the spindle. The dancer could be a spring loaded device or a fluid cylinder loaded device. The dancer tube is shown at 77. The tube is made from carbon, metal or other material. The tube in operation has the carbon fiber wrapped around it from the carbon fiber spool, 180 degrees during operation. The carbon fiber slides up and down the tube 77 and rolls around the rotational axis of the tube. The dancer tube is mounted on a linear rail 85, with a spring 78 tending to maintain the dancer assembly in its nominal zero position along the rail. Spring 78 generally should have the lowest spring rating as possible, while maintaining the ability to accelerate the dancer adequately to maintain contact with the carbon fiber from the spool, maintaining tension. Spring 78 is anchored by a bolt 80 to a dancer block element 82. The block 82 contains both the spring anchor and a small spacer to adjust the nominal position of the dancer tube when it is fully retracted. This ensures that the dancer will always be within the linear sensor measurement range.

The dancer tube and all the dancer assembly elements are mounted on a back plate/frame 83. Plate 83 is mounted to the back plate of the modular head/end effector. The dancer tube is mounted on a bearing assembly 84 which allows for linear motion of the dancer assembly along rail 85. The dancer tube is bolted directly to the top of the bearing assembly. A linear displacement sensor/linear encoder 87 in the embodiment shown is mounted on the bearing elements, moving with the carbon fiber dancer to indicate linear displacement as the dancer assembly moves to maintain tension.

Mounted at one end of the plate 83, is a pin stop 88 which prevents the dancer tube from leaving the linear rail in the event of a malfunction. The pin stop includes a small urethane bumper element. A magnetic linear displacement sensor 90 feeds a signal back to the servo motor/controller in order to maintain tension control over the tape as it moves from the spool.

Figure 10:
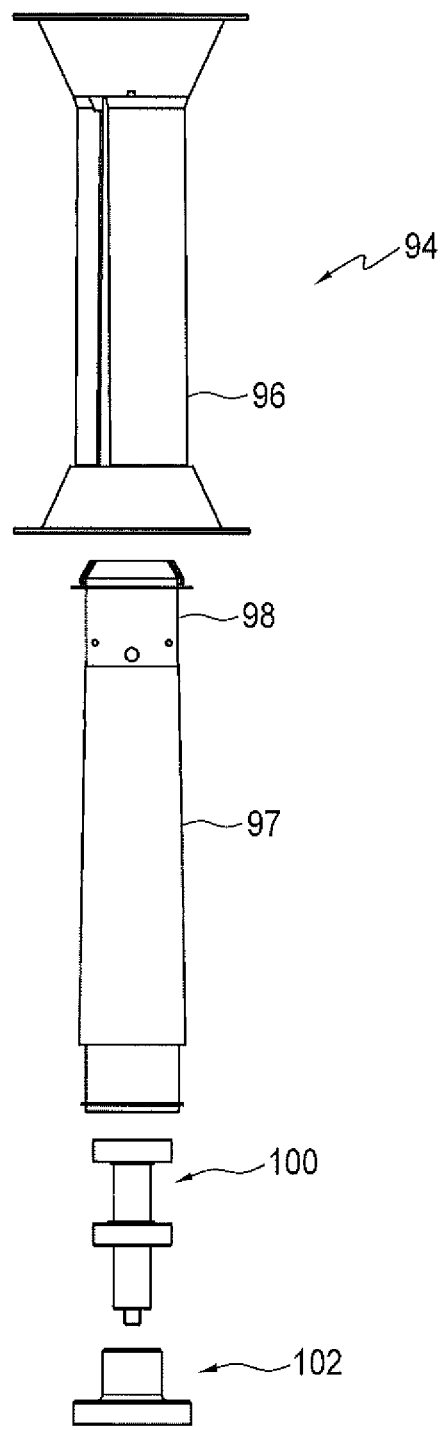
FIG. 10 is an exploded view of the fiber breaker member of the modular head assembly.

FIG. 10 shows the backing film sleeve/remover, if present. The assembly shown generally at 94 is injection molded plastic and in operation sandwiches the backing film between a sleeve 96 and spindle 97. When the carbon fiber is payed out, friction rotates the spindle 97 and the backing film is wrapped around the outside of the sleeve, separating the backing film from the fiber. Spring loaded member 98 is compressed when the film sleeve is moved onto spindle 97. When the sleeve is in the down position, the spring member moves outwardly preventing the film sleeve from sliding off. The film sleeve in operation slides on to the spindle and locks in place The overall assembly is press fitted into the spindle and retained by rings 100. The assembly is bolted to a spindle mount 102, which is bolted to the back plate of the modular head assembly.

In operation of the spool assembly, in the present embodiment, the servo motor/controller rotates the fiber spindle at a controlled speed. The motor has diameter information updated by a PLC on the module head and directly receives the linear displacement information for the dancer. The fiber as it is payed out moves around the backing assembly and the dancer before it extends around one or more redirects to the placement tool which applies the tape to the part. The dancer assembly moves linearly along the dancer rail in order to maintain the proper tension of the fabric tape. The use of a servo motor/controller for each separate spool assembly is advantageous as it allows significantly increased speed and acceleration of payout of the tape while maintaining desired tension.

Figure 6:
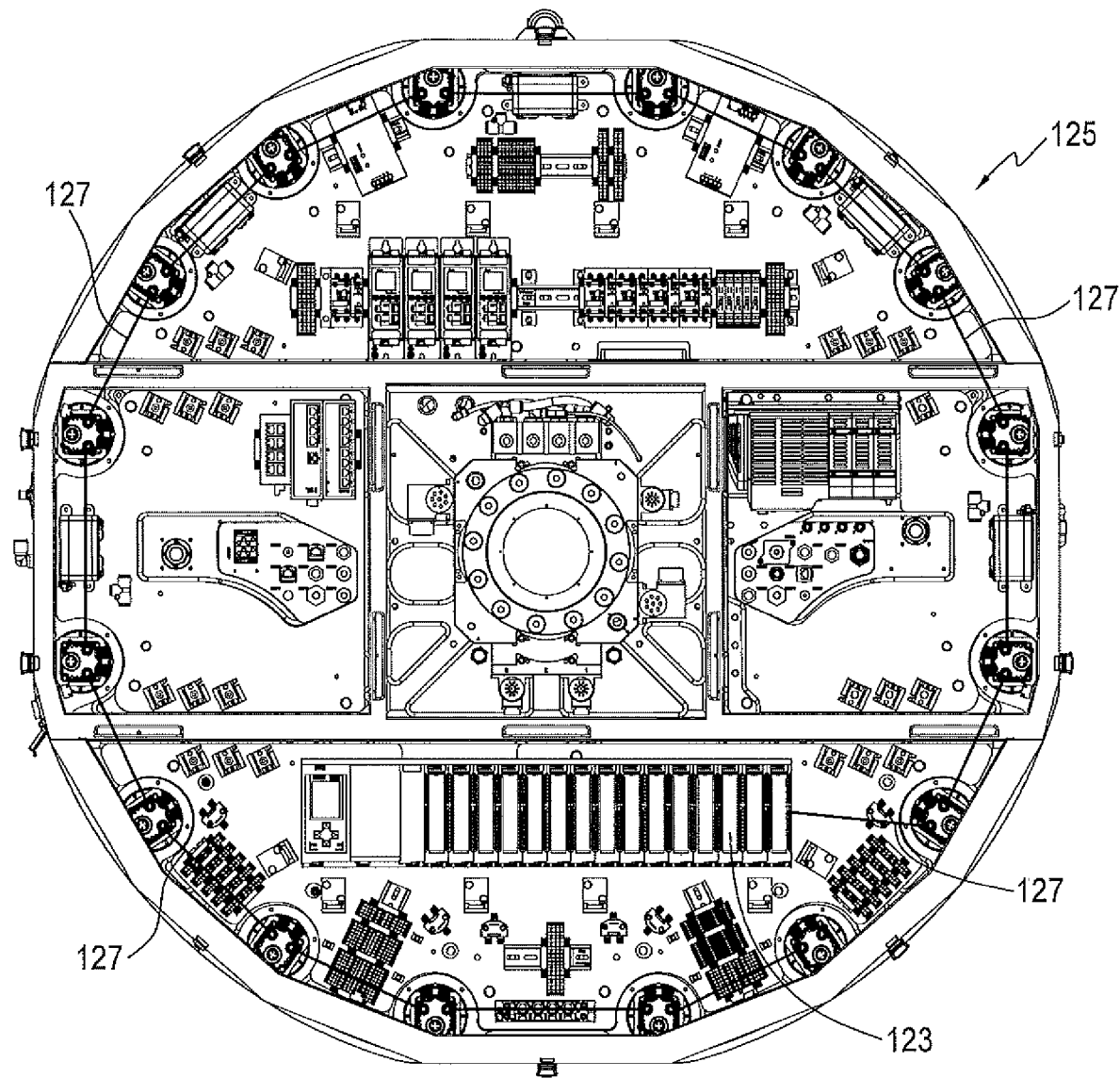
FIG. 6 is a rear elevational view of the modular head assembly.

FIG. 6 shows a rear view of the modular head. The embodiment shown includes a PLC computer/controller 123 positioned in the head 125. In one embodiment, all of the control lines and driver lines for each of the individual servo motors are provided via daisy chain communication lines 127 to and from the PLC, thus eliminating the large number of control lines which would have to extend back to the main (remote) CNC computer. Both of the described embodiments make the modular head using servo motors feasible in a practical environment.

The module head assembly described above will have electrical and fluid connection with the AFP machine. Preferably the electrical connections will not be servo motor connections. The modular assembly is removable/replaceable from the AFP machine, as described below.

Figure 11:
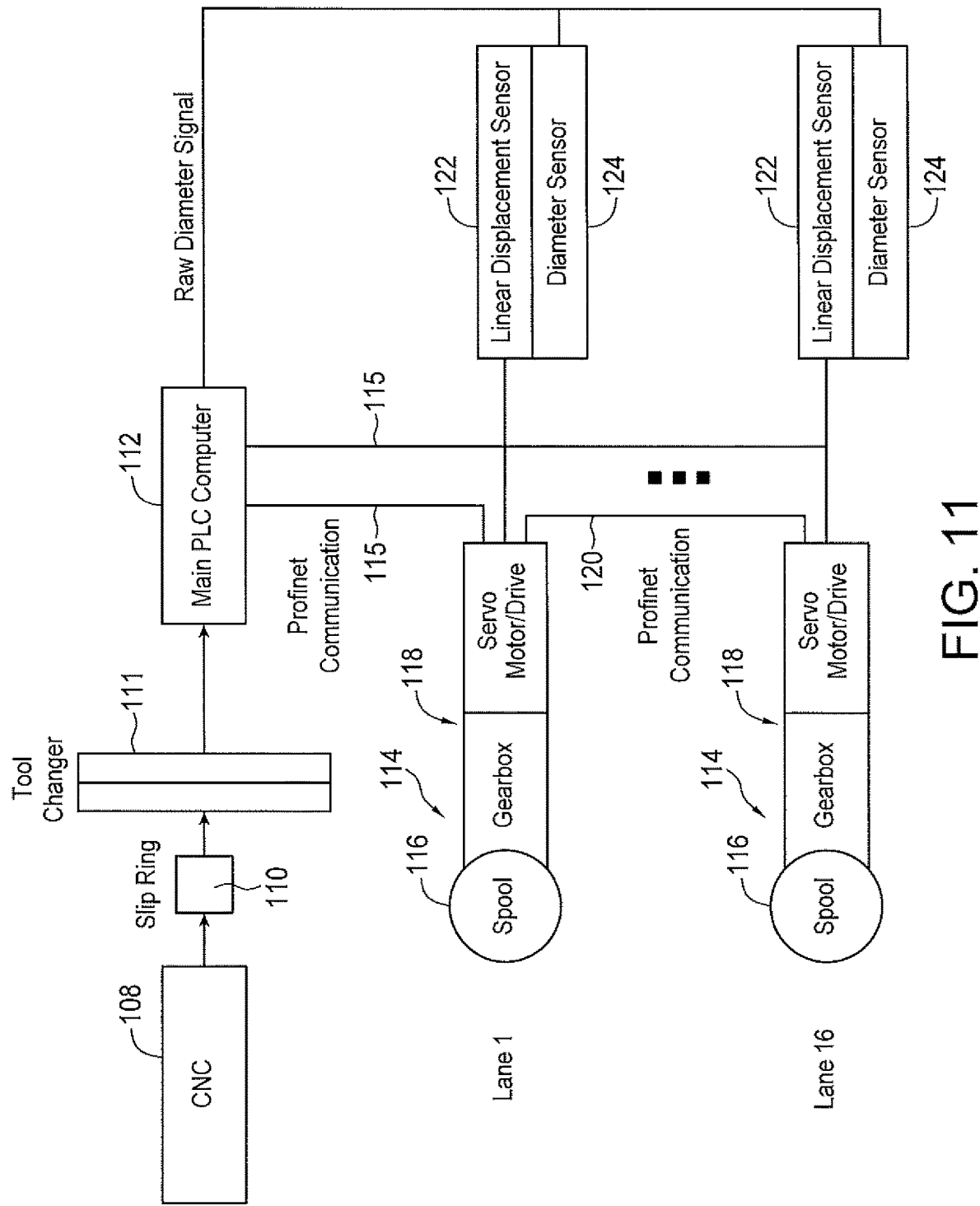
FIG. 11 is a block diagram of the control system of the modular head assembly of the present invention.
Figure 12:
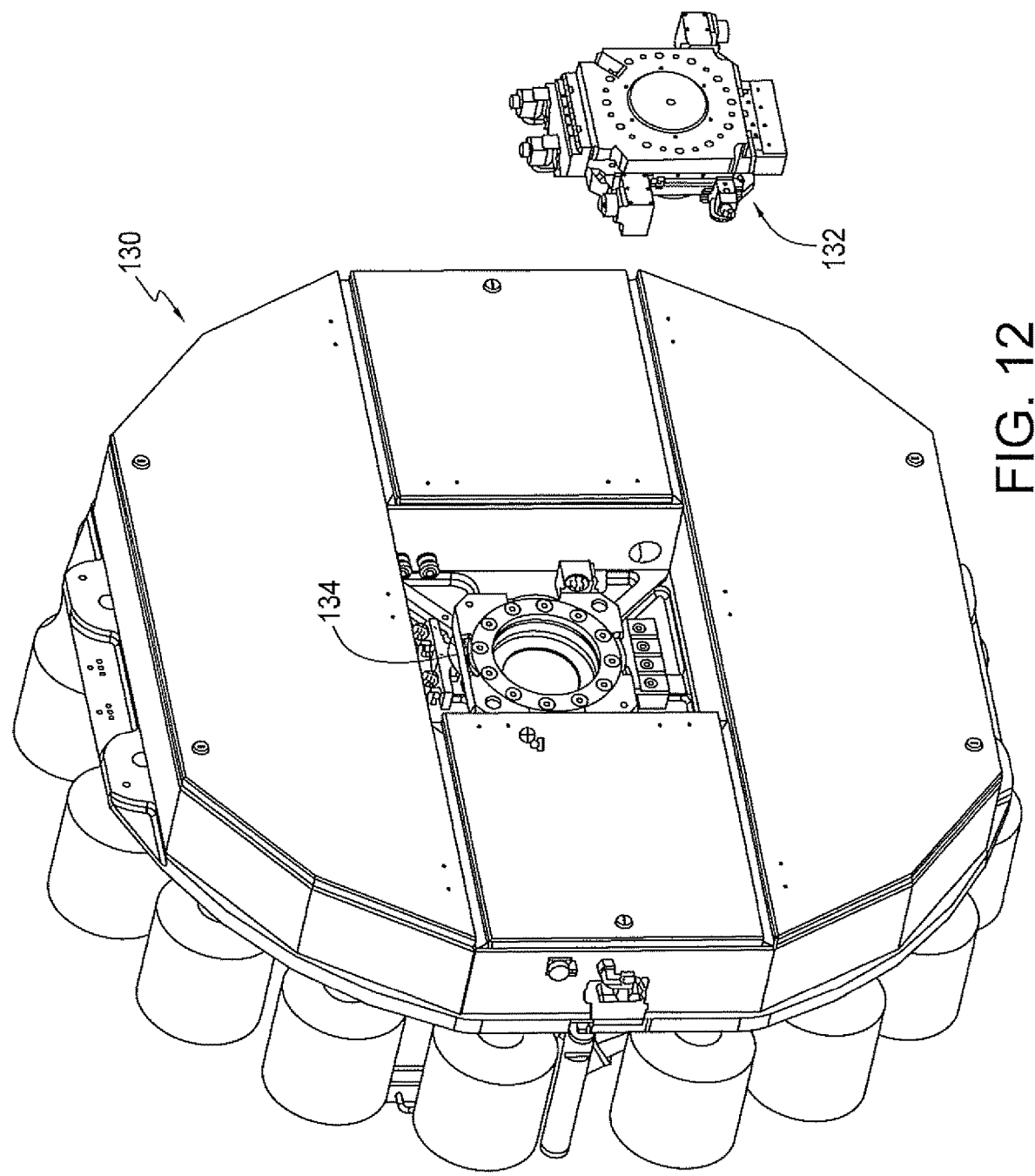
FIG. 12 is a perspective view of a tool charger arrangement by which the modular head assembly can be automatically removed/changed.

FIG. 11 shows a basic schematic for the embodiment using a PLC on the modular head/end effector. The fiber replacement machine includes a CNC computer 108 located remotely from the modular head. Connecting the CNC computer in the embodiment shown to the modular head, which includes a plurality of spool assemblies, is a slip ring arrangement 110, such as made by Moog, Inc. A conventional ATI tool charger assembly 111 is also included. An automatic tool changer such as an ATI tool changer is shown in FIG. 12. A modular head assembly is shown at 130. The tool changer is a two part mating system to join a master side or portion 132 connected to the AFP machine with a tool side or portion 134 which carries the head assembly or end effector. It is pneumatically activated and carries electrical power, signals and fluid utilities trough the mechanical coupling. The process of changing the tool (head assembly) 130 can be effectively accomplished using preprogrammed motions and commands, by a controller from the tool changer. All electrical and fluid connections are made simply, reliably, quickly and less expensively. The tool changer is in effect an automatic, i.e programmable, detachable interface by which a head assembly can be conveniently changed/replaced. Each modular head will include a PLC computer 112. Communicating with the PLC computer 112 are the plurality of individual spool assemblies 114-114 via individual communication lines 115. Lines 115 and 120 represent a daisy chain of profinet communications. The embodiment shown includes a total of 16 spool assemblies arranged around the modular head, although it should be understood that a different number of spool assemblies can be used. Each spool assembly includes a spool 116 containing fiber tape and an integrated servo motor/controller with gearbox, shown generally at 118. Each spool assembly will include a dancer linear displacement sensor 122, and a fiber spool diameter sensor 124.

In the embodiment of FIG. 11, the output of the linear displacement sensor on the dancer will be applied directly to the motor drive unit, while the diameter sensor output for each spool assembly will be applied to the PLC computer. This arrangement provides the required tensioning control over a wide variety of acceleration rates, and results in a significantly increased payout rate under good tension control. While the embodiment of FIG. 11 uses a PLC computer, with connections to each of the servo motor drives units, each servo motor/controller can be sufficiently smart and capable that it can itself produce the required motion and control with diameter and dancer displacement information, without a PLC computer. In some applications, this arrangement is preferred. Further, it is also possible that at least some and perhaps all of the servo motor wiring connections can be provided through a specialized slip ring arrangement back to the CNC computer, permitting the use of what can be characterized as a less capable servo motor.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A modular end effector for a fiber placement machine; comprising:
   a plurality of individual carbon fiber spool assemblies, each spool assembly including a spindle with a spool containing carbon fiber tow, a servo motor with electrical drive, and a dancer assembly for tensioning the carbon fiber tow as it moves from the carbon fiber tow containing spool to a tool assembly which applies the carbon fiber tow to a part;
   a sensor assembly for each carbon fiber spool assembly for measuring the dancer assembly position;

wherein the servo motor controls the rotation of the carbon fiber tow containing spool to maintain the dancer assembly position and thereby control tension on the carbon fiber tow;

a disconnecting device for the modular end effector relative to the fiber placement machine, the modular end effector being attached mechanically, with electrical and fluid connections to the fiber placement machine; and wherein electrical drives for the servo motors which drive the fiber spool assemblies are located in the modular end effector, reducing the number of electrical connections which extend through the disconnecting device to the fiber placement machine.

2. The end effector of claim 1, including a gearbox associated with each servo motor.

3. The end effector of claim 1, including a control computer or control computers on the end effector, for receiving position information of the dancer and controlling the servo motors accordingly, thereby reducing electrical connections between the modular end effector and the fiber placement machine.

4. The end effector of claim 1, including a slip ring assembly between the disconnecting device and the fiber placement machine permitting rotation of the modular end effector relative to the fiber placement machine.

5. The system of claim 3, in which a spool diameter sensor is provided for each spool and information from the spool diameter sensor is provided to the control computer or control computers.

6. The system of claim 1, in which the dancer position is sensed by a linear encoder.

7. The system of claim 1, wherein the servo motor is movable in both directions, forward and reverse, to maintain proper tension on the tow.

8. The system of claim 1, including a support member on which the plurality of carbon fiber spool assemblies are mounted.

* * * * *